United States Patent [19]
Banyas

[11] Patent Number: 5,814,969
[45] Date of Patent: Sep. 29, 1998

[54] APPARATUS FOR SELECTIVELY ACTIVATING A PLURALITY OF DEVICES

[75] Inventor: Timothy James Banyas, Cary, N.C.

[73] Assignee: Ericsson Inc., Research Triangle Park, N.C.

[21] Appl. No.: 717,970

[22] Filed: Sep. 23, 1996

[51] Int. Cl.$^6$ ........................................................ H02J 7/00
[52] U.S. Cl. ............................ 320/112; 320/107; 320/106
[58] Field of Search ..................................... 320/107, 112, 320/113, 114, 115, 106; 455/89; 379/61, 62

[56] References Cited

U.S. PATENT DOCUMENTS

| | | | |
|---|---|---|---|
| 4,700,375 | 10/1987 | Reed | 379/61 |
| 4,709,202 | 11/1987 | Koenck et al. | 320/43 |
| 5,274,319 | 12/1993 | Keener et al. | 320/2 |
| 5,371,453 | 12/1994 | Fernandez | 320/5 |
| 5,420,493 | 5/1995 | Hargadon et al. | 320/15 |
| 5,511,240 | 4/1996 | Nishiyama | 455/127 |
| 5,534,765 | 7/1996 | Kretsinger et al. | 320/30 |
| 5,539,298 | 7/1996 | Perkins et al. | 320/21 |
| 5,572,110 | 11/1996 | Dunstan | 320/30 |
| 5,589,756 | 12/1996 | Wilson et al. | 320/22 |

FOREIGN PATENT DOCUMENTS

| | | | |
|---|---|---|---|
| 06655628 | 8/1995 | European Pat. Off. | H02J 7/10 |
| 0665628 | 8/1995 | European Pat. Off. | H02J 7/10 |
| 0673103 | 9/1995 | European Pat. Off. | H02J 7/00 |
| WO96/28922 | 9/1996 | WIPO | H04M 1/72 |
| WO9628922A | 9/1996 | WIPO | H04M 1/72 |

*Primary Examiner*—Peter S. Wong
*Assistant Examiner*—K. Shin

[57] ABSTRACT

An apparatus for selectively activating a plurality of functional devices, including a charging circuit for a battery, has a connector for making connection intermediate a battery and its associated devices, such as a cellular telephone, a portable computer, a battery charger or a combination telephone/charger. The connection is coupled to a plurality of signal distinguishing devices, at least one of which is coupled with the battery charging circuit. Each signal distinguishing device is coupled directly or intermediately to one or more additional signal distinguishing devices or to more or more functional devices.

The plurality of signal distinguishing devices preferably includes a first frequency discriminating filter and a second frequency discriminating filter. The first frequency discriminating filter is coupled intermediate the charging pole of the battery and the battery charging circuit. The second frequency discriminating filter is coupled intermediate the charging pole of the battery and a second functional device. At least one selected frequency discriminating filter is a low pass filter and at least one selected frequency discriminating filter is a high pass filter. The apparatus, which may be connected by a single connection intermediate a battery and its associated electronic device, is preferably integrally packaged with the battery.

14 Claims, 2 Drawing Sheets

APPARATUS FOR SELECTIVELY ACTIVATING A PLURALITY OF DEVICES

BACKGROUND OF THE INVENTION

1. Field of Invention

The present invention relates generally to an apparatus for controlling the operation of functional devices, and specifically to an apparatus for selectively activating a plurality of functional devices. In particular, the present invention provides an apparatus which can selectively activate a plurality of functional devices using a single connection for communicating actuating signals.

2. Description of Related Art

There is presently a trend in the electronics industry towards designing, developing and manufacturing smaller devices having increased functionality. This typically involves designing one device or apparatus to accommodate double duties. However, as the number of functions performed by a device increases, it becomes more and more difficult and expensive to control the various functions.

Battery packs are widely used to power small electronic devices such as cellular telephones. The main function of a battery pack is to provide power to an electronic device such as a cellular phone or a portable computer. However, it may be desirable to include additional functionality in the battery pack. In a cellular telephone, such additional functionality might include a vibrating alarm, an infrared (IR) communication device or a status indicator device. In existing devices, a separate contact is used to control each function, i.e., either for charging a battery, or activating some additional function.

Functional devices built into a battery pack are typically controlled by means of electrical signals received from an external electronic device such as a cellular telephone, a laptop computer, a standalone battery charger, or a telephone/charger combination. To provide an additional control signal previously required the addition of an extra electrical contact between the battery pack and the external electronic device. As price pressures grow and battery packs and their associated electronic devices become smaller, the number of electrical contacts becomes a major concern for mechanical designers. It would be advantageous to add functionality to a device without causing a substantial effect on the size and cost of the device. Specifically, it would be advantageous to provide an apparatus which allows a functional device such as a vibrating alarm or an IR device located within a battery pack to be controlled through the same electrical contact which charges the battery.

SUMMARY OF THE INVENTION

An apparatus is provided for selectively activating a plurality of functional devices, including a charging circuit for a battery. Preferably, the activation of the plurality of the functional devices is accomplished by using a single connection intermediate a battery and its associated device, such as a cellular telephone or battery charger. The connection is coupled to a plurality of signal distinguishing devices. At least one of the plurality of signal distinguishing devices is be coupled to a battery charging circuit.

In a preferred embodiment, the apparatus further includes a positive pole, a negative pole, and a charging pole. The charging pole provides the connection intermediate the battery and the external device by which the functional devices are selectively activated.

The plurality of signal distinguishing devices preferably includes a first frequency discriminating filter and a second frequency discriminating filter. The first frequency discriminating filter is coupled intermediate the charging pole and a first functional device. The second frequency discriminating filter is coupled intermediate the charging pole and a second functional device. At least one selected frequency discriminating filter is a low pass filter and at least one selected frequency discriminating filter is a high pass filter.

The present invention provides an apparatus which can selectively activate a number of functional devices using a single connection for receiving actuating signals by superimposing a plurality of actuating signals of different frequencies on one charging line. The advantage of using a single connection is to reduce the number of electrical contacts between the functional device and the signaling device, thereby allowing design of a smaller electronic device using the present invention.

Accordingly, it is an object of the present invention to provide an apparatus for selectively activating a plurality of functional devices.

It is yet another object of the present invention to provide an apparatus for selectively activating a plurality of functional devices which may be connected by a single connection intermediate a battery and its associated electronic device integrally packaged with the battery.

These and other objects of the invention, together with features and advantages thereof will become apparent from the following detailed specification when read with the accompanying drawings in which like reference numerals refer to like elements.

DETAILED DESCRIPTION OF THE PREFERRED EMBODIMENTS

The present invention will now be described with reference to the accompanying drawings, in which a preferred embodiment of the invention is shown. However, this invention may be embodied in many different forms and should not be construed as limited to the specific embodiment shown. Rather, the preferred embodiment is provided so that this disclosure is thorough and complete, and will fully convey the scope of the invention to those skilled in the art.

Figure 1:
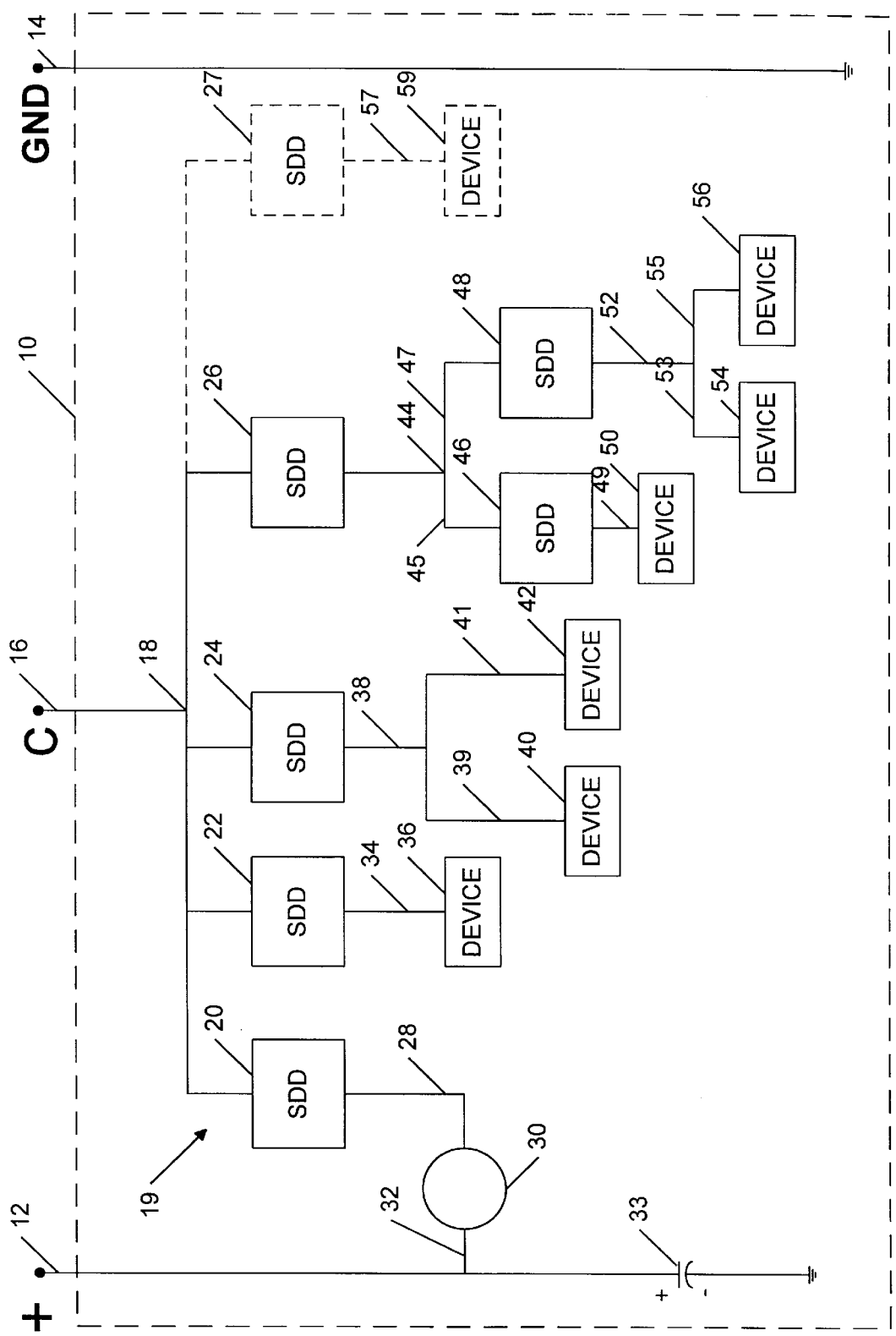
FIG. 1 is a schematic block diagram of the apparatus

FIG. 1 is a schematic block diagram of the apparatus. In FIG. 1, an apparatus 10 has a positive pole 12, a negative pole 14 and a charging pole 16. Charging pole 16 is coupled via a connection line 18 with a plurality of signal distinguishing devices (SDD), generally indicated by reference numeral 19. The plurality of SDDs 19 includes SDD 20, SDD 22, SDD 24, SDD 26 and SDD 27. SDD 20 is connected via a line 28 with a charging circuit 30. Charging circuit 30 is connected via a line 32 with positive pole 12 for charging a battery 33. SDD 22 is connected via a line 34 with a functional device 36. SDD 24 is connected via lines 38 and 39 with a functional device 40, and is connected via lines 38 and 41 with a functional device 42. SDD 26 is connected via lines 44 and 45 with SDD 46, and is connected via lines 44 and 47 with SDD 48. SDD 46 is connected via a line 49 with a functional device 50. SDD 48 is connected via lines 52 and 55 with a functional device 56, and via lines 52 and 53 with a functional device 54. SDD 27 is connected via a line 57 with a functional device 59. SDD 27 is shown in phantom to indicate that the apparatus 10 may comprise an arbitrary number of SDDs 19.

In operation, a signal transmitted through charging pole 16 is further transmitted via line 18 to plurality of SDDs 19. Plurality of SDDs 19 are each tuned to pass a predetermined signal. A signal passing through SDD 20 is transmitted via a connection line 28 to charging circuit 30. Battery 33 will be charged as SDD 20 passes the corresponding signal to charging circuit 30 via line 28. A signal received at charging pole 16 is also transmitted to SDD 22 via line 18. The signal passing through SDD 22 will be transmitted via line 34 to functional device 36. Functional device 36 responds to the signal received via line 34. A signal received at charging pole 16 is also transmitted via line 18 to SDD 26 and further transmitted via lines 44 and 45 to SDD 46. SDD 46 further passes a predetermined signal via line 49 to functional device 50. Functional device 50 responds to the signal received via line 49. A signal is also transmitted via line 18 to SDD 26 and further transmitted via lines 44 and 47 to SDD 48. SDD 48 further passes a predetermined signal via lines 52, 53 and 55 to functional devices 54 and 56. Functional device 54 responds to the signal received via lines 52 and 53. SDD 48 also passes the predetermined signal on line 52 to functional device 56 via line 55. Functional device 56 responds to the signal received via lines 52 and 55.

Thus, a signal transmitted through charging pole 16 is transmitted via line 18 to plurality of SDDs 19. Plurality SDDs 19 are tuned to pass a predetermined signal via lines 28, 34, 38, 39, 41, 44, 45, 46, 47, 49, 52, 53 and 55. The transmitted predetermined signals effect selective operation of devices 30, 36, 40, 42, 50, 54 and 56.

Figure 2:
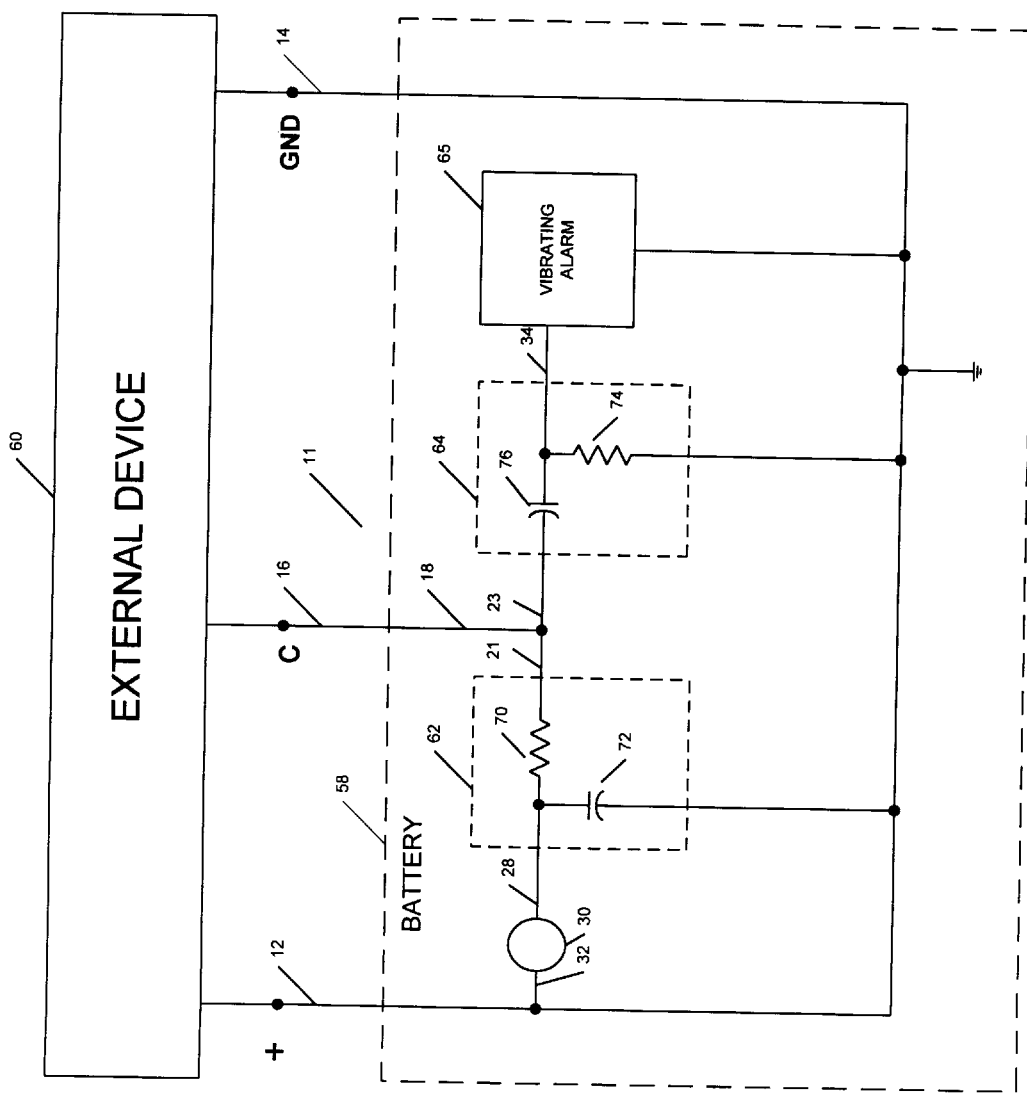
FIG. 2 is a schematic diagram of the preferred embodiment of the apparatus.

FIG. 2 is a schematic diagram of the preferred embodiment of the invention. In FIG. 2, an apparatus 11 is integrally packaged with a battery 58. Battery 58 has charging pole 16. Charging pole 16 is connected with an external device 60. In a preferred embodiment, external device 60 is a cellular telephone, laptop computer, battery charger or combination telephone/charger. Charging pole 16 is connected via lines 18 and 21 with a low pass filter 62. Low pass filter 62 is connected via line 28 with charging circuit 30. In the preferred embodiment, low pass filter 62 includes a resistor 70 and a capacitor 72. Resistor 70 is coupled in series with charging circuit 30 and capacitor 72 is coupled in parallel with charging circuit 30.

Charging circuit 30 is connected via line 32 with positive pole 12. Charging pole 16 is also connected via lines 18 and 23 with a high pass filter 64. High pass filter 64 is connected via line 34 to a vibrating alarm 65. In the preferred embodiment, high pass filter 64 includes a resistor 74 and a capacitor 76. Capacitor 76 is coupled in series with vibrating alarm 65 and resistor 74 is coupled in parallel with vibrating alarm 65.

In operation, a signal having a high-frequency component and a low-frequency component is received through charging pole 16. Charging pole 16 is connected to both filters 62 and 64. The signal is transmitted from charging pole 16 via line 18 and line 21 to low pass filter 62, which filters out the high frequency component of the signal and passes the low frequency component of the signal to line 28. The filtered low frequency component of the signal will be received at charging circuit pole 30. The signal received at charging pole 16 and transmitted via line 18 is also transmitted on line 23 to high pass filter 64. High pass filter 64 filters out the low frequency component of the signal on line 23 and passes the high frequency component of the signal over line 34 to the functional device 65. The filtered high frequency component of the signal actuates functional device 65 which, in the illustrated embodiment, is a vibrating alarm responsive to a high-frequency signal.

Thus, a signal received through charging pole 16 is transmitted to low pass filter 62 and high pass filter 64. Low pass filter 62 and high pass filter 64 are tuned to pass a predetermined signal via lines 28 and 34. Thus, the transmitted signal selectively activates devices 30 and 65 as determined by the frequency of the transmitted signal.

While the present invention has been described with respect to its preferred embodiment, those skilled in the art will recognize that the present invention is not limited to the specific embodiment described and illustrated herein. Different embodiments and adaptations besides those shown herein and described as well as many variations, modifications and equivalent arrangements will now be apparent or will be reasonably suggested by the foregoing specification and drawings, without departing from the substance or scope of the invention. While the present invention has been described herein in detail in relation to its preferred embodiment, it is also understood that this disclosure is only illustrative and exemplary of the present invention and is made merely for purpose of providing a full and enabling disclosure of the invention. Accordingly, it is intended that the invention be limited only by the spirit and scope of the claims appended hereto.

What is claimed is:

1. An apparatus for selectively activating a plurality of functional devices within a battery housing, comprising:

at least one connection intermediate the battery housing and at least one external device; and a plurality of signal distinguishing devices disposed within said battery housing and coupled with said at least one connection;

wherein each of said plurality of functional devices performs at least one function and each of the functional devices is coupled with said plurality of signal distinguishing devices in a configuration facilitating said selective operation.

2. The apparatus of claim 1, wherein at least one of said plurality of functional devices is a battery charging circuit.

3. An apparatus for selectively activating a plurality of devices as recited in claim 1 wherein the apparatus is integrally packaged with said battery housing.

4. An apparatus for selectively activating a plurality of devices as recited in claim 1 wherein at least one selected signal distinguishing device of said plurality of signal distinguishing devices is a low pass filter.

5. An apparatus for selectively activating a plurality of devices as recited in claim 1 wherein said at least one selected signal distinguishing device of said plurality of signal distinguishing devices is a high pass filter.

6. An apparatus for selectively activating a plurality of devices as recited in claim 1 wherein said apparatus further comprises a positive pole, a negative pole, and a charging pole; said charging pole comprising said at least one connection.

7. An apparatus for selectively activating a plurality of devices as recited in claim 6 wherein said plurality of signal distinguishing devices includes a first frequency discriminating filter and a second frequency discriminating filter; said first frequency discriminating filter being coupled intermediate said charging pole and a first functional device; said second frequency discriminating filter being coupled intermediate said charging pole and a second functional device.

8. An apparatus for distinguishing among a plurality of signals; respective signals of said plurality of signals having different frequencies; the apparatus comprising:

at least one connection intermediate a battery housing and at least one external device;

a plurality of signal distinguishing devices being disposed within said battery housing and coupled with said at least one connection to establish a signal distinguishing network;

said signal distinguishing network being coupled with a plurality of functional devices; said plurality of functional devices including a charging circuit; and each respective functional device of said plurality of functional devices performing at least one function; said signal distinguishing network cooperating with said plurality of functional devices to perform respective said functions selectively in response to predetermined said frequencies.

9. An apparatus for distinguishing among a plurality of signals as recited in claim 8 wherein the apparatus is integrally packaged with said battery.

10. An apparatus for distinguishing among a plurality of signals as recited in claim 8 wherein at least one selected signal distinguishing device of said plurality of signal distinguishing devices is a low pass filter.

11. An apparatus for distinguishing among a plurality of signals as recited in claim 8 wherein said at least one selected signal distinguishing device of said plurality of signal distinguishing devices is a high pass filter.

12. An apparatus for distinguishing among a plurality of signals as recited in claim 8 wherein said apparatus further comprises a positive pole, a negative pole, and a charging pole; said charging pole being said at least one connection.

13. An apparatus for distinguishing among a plurality of signals as recited in claim 12 wherein said plurality of frequency distinguishing devices includes a first frequency discriminating filter and a second discriminating filter; said first frequency discriminating filter being coupled intermediate said charging pole and a first device of said plurality of devices; said second frequency discriminating filter being coupled intermediate said charging pole and a second device of said plurality of devices.

14. An apparatus for selectively activating a plurality of functional means for performing a function; said plurality of functional means including a charging means for charging a battery disposed within a housing; the apparatus comprising:

a connection means for establishing connection; said connection means establishing at least one connection intermediate said battery and at least one communication device;

a plurality of signal distinguishing means for distinguishing signals; said plurality of signal distinguishing means being disposed within said battery housing and coupled with said connection means;

said charging means being connected with at least one signal distinguishing means of said plurality of signal distinguishing means; and each respective functional means of said plurality of functional means performing at least one function, each said respective functional means being coupled with said plurality of signal distinguishing means in a configuration facilitating said selective operation.

\* \* \* \* \*